United States Patent
Chen et al.

(10) Patent No.: US 9,514,405 B2
(45) Date of Patent: *Dec. 6, 2016

(54) SCORING CONCEPT TERMS USING A DEEP NETWORK

(71) Applicant: Google Inc., Mountain View, CA (US)

(72) Inventors: Kai Chen, San Bruno, CA (US); Xiaodan Song, San Jose, CA (US); Gregory S. Corrado, San Francisco, CA (US); Kun Zhang, Union City, CA (US); Jeffrey A. Dean, Palo Alto, CA (US); Bahman Rabii, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/860,462

(22) Filed: Sep. 21, 2015

(65) Prior Publication Data

US 2016/0012331 A1     Jan. 14, 2016

Related U.S. Application Data

(63) Continuation of application No. 13/802,184, filed on Mar. 13, 2013, now Pat. No. 9,141,906.

(51) Int. Cl.
   *G06F 15/18*      (2006.01)
   *G06E 1/00*       (2006.01)
   (Continued)

(52) U.S. Cl.
   CPC ......... *G06N 3/084* (2013.01); *G06F 17/30707* (2013.01); *G06F 17/30864* (2013.01);
   (Continued)

(58) Field of Classification Search
CPC combination set(s) only.
See application file for complete search history.

(56) References Cited

U.S. PATENT DOCUMENTS 6,044,375 A     3/2000    Shmueli et al.
7,694,188 B2 *   4/2010    Raghuraman ......... G06F 11/004
                                                                        714/47.1
(Continued)

OTHER PUBLICATIONS

Adding reinforcement learning features to the neural-gas method M. Winter; G. Metta; G. Sandini Neural Networks, 2000. IJCNN 2000, Proceedings of the IEEE-INNS-ENNS International Joint Conference on Year: 2000, vol. 4 pp. 539-542 vol. 4, DOI: 10.1109/IJCNN.2000.860827 IEEE Conference Publications.*

Adaptive watermark scheme with RBF neural networks Zhang Zhi-Ming; Li Rong-Yan; Wang Lei Neural Networks and Signal Processing, 2003. Proceedings of the 2003 International Conference on Year: 2003, vol. 2 pp. 1517-1520 vol. 2, DOI: 10.1109/ICNNSP.2003.1281164 IEEE Conference Publications.*

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, for scoring concept terms using a deep network. One of the methods includes receiving an input comprising a plurality of features of a resource, wherein each feature is a value of a respective attribute of the resource; processing each of the features using a respective embedding function to generate one or more numeric values; processing the numeric values to generate an alternative representation of the features of the resource, wherein processing the floating point values comprises applying one or more non-linear transformations to the floating point values; and processing the alternative representation of the input to generate a respective relevance score for each concept term in a pre-determined set of concept terms, wherein each of the respective relevance scores measures a predicted relevance of the corresponding concept term to the resource.

20 Claims, 3 Drawing Sheets

(51) Int. Cl.
*G06E 3/00* (2006.01)
*G06G 7/00* (2006.01)
*G06N 3/08* (2006.01)
*G06F 17/30* (2006.01)
*G06N 3/04* (2006.01)
*G06Q 30/02* (2012.01)

(52) U.S. Cl.
CPC .............. *G06N 3/04* (2013.01); *G06N 3/0427* (2013.01); *G06N 3/08* (2013.01); *G06Q 30/02* (2013.01)

(56) References Cited

U.S. PATENT DOCUMENTS

| | | | | |
|---|---|---|---|---|
| 7,716,225 | B1 * | 5/2010 | Dean | G06F 17/30867 707/748 |
| 7,895,148 | B2 | 2/2011 | Ma et al. | |
| 8,117,209 | B1 * | 2/2012 | Dean | G06F 17/30867 707/727 |
| 8,180,754 | B1 | 5/2012 | Ershov | |
| 8,473,439 | B2 * | 6/2013 | Arthur | G06N 3/049 706/35 |
| 8,768,870 | B1 * | 7/2014 | Corrado | G06N 99/005 706/12 |
| 8,873,813 | B2 | 10/2014 | Tadayon et al. | |
| 9,037,464 | B1 * | 5/2015 | Mikolov | G06F 17/2785 704/255 |
| 9,141,906 | B2 * | 9/2015 | Chen | G06N 3/08 |
| 9,141,916 | B1 * | 9/2015 | Corrado | G06N 3/0454 |
| 9,147,154 | B2 * | 9/2015 | Wang | G06N 3/02 |
| 9,218,573 | B1 * | 12/2015 | Corrado | G06N 99/005 |
| 9,305,099 | B1 * | 4/2016 | Dean | G06F 17/30867 |
| 9,372,914 | B1 * | 6/2016 | Asuncion | G06F 17/30598 |
| 2003/0225763 | A1 | 12/2003 | Guilak et al. | |
| 2004/0018561 | A1 | 1/2004 | DeCrescenzo et al. | |
| 2010/0057717 | A1 | 3/2010 | Kulkarni | |
| 2010/0121706 | A1 | 5/2010 | Arena et al. | |
| 2011/0029463 | A1 | 2/2011 | Forman et al. | |
| 2013/0066814 | A1 | 3/2013 | Bosch et al. | |
| 2014/0279773 | A1 | 9/2014 | Chen et al. | |
| 2014/0279774 | A1 | 9/2014 | Wang et al. | |

OTHER PUBLICATIONS

Robust human iris pattern recognition system using neural network approach Mrunal M. Khedkar; S. A. Ladhake Information Communication and Embedded Systems (ICICES), 2013 International Conference on Year: 2013 pp. 78-83, DOI: 10.1109/ICICES.2013. 6508356 IEEE Conference Publications.*

SOM with neighborhood step decay for motor current based diagnostics Francisco J. Maldonado; Stephen Oonk; Karl Reichard; Jesse Pentzer 2014 IEEE International Conference on Systems, Man, and Cybernetics (SMC) Year: 2014 pp. 2687-2692, DOI: 10.1109/SMC.2014.6974333 IEEE Conference Publications.*

Dean et al., "Large Scale Distributed Deep Networks," Advances in Neural Information Processing Systems 25, Neural Information Processing Systems Conference (NIPS), Dec. 2012; Retrieved from the Internet: < URL: http://papers.nips.cc/paper/4687-large-scale-distributed-deep-networks.pdf>, 11 pages.

Salakhutdinov and Hinton, "Semantic hashing," International Journal of Approximate Reasoning 50(7):969-978, Jul. 2009, published online Dec. 10, 2008.

Min et al., "A Deep Non-linear Feature Mapping for Large-Margin kNN Classification," Ninth IEEE International Conference on Data Mining, 2009 (ICDM '09), Dec. 6, 2009, pp. 357-366.

International Search Report and Written Opinion in International Application No. PCT/US2014/026352, mailed Aug. 6, 2014, 13 pages.

Office Action issued in Australian Application No. 2014201827 on May 20, 2014, 4 pages.

Kan et al, "Stacked Progressive Auto-Encoders (SPAE) for Face Recognition Across Poses," Computer Vision and Pattern Recognition (CVPR), 2014 IEEE Conference on DOI: 10.1109/CVPR. 2014.243 Publication Year: 2014, pp. 1883-1890.

Gokhale et al., "A 240 G-ops/s Mobile Coprocessor for Deep Neural Networks," Computer Vision and Pattern Recognition Workshops (CVPRW), 2014 IEEE Conference on DOI: 10.1109/CVPRW.2014. 106 Publication Year: 2014, pp. 696-701.

Hayat et al., "Learning Non-linear Reconstruction Models for Image Set Classification," Computer Vision and Pattern Recognition (CVPR), 2014 IEEE Conference on DOI: 10.1109/CVPR.2014. 246 Publication Year: 2014, pp. 1915-1922.

* cited by examiner

SCORING CONCEPT TERMS USING A DEEP NETWORK

CROSS-REFERENCE TO RELATED APPLICATION

This application is a continuation of U.S. application Ser. No. 13/802,184, filed on Mar. 13, 2013, the disclosure of which is hereby incorporated by reference in its entirety.

BACKGROUND

This specification relates to identifying concept terms that are relevant to resources.

Internet resources (e.g., web pages, images, text documents, multimedia content) may include content that describes any of a wide variety of concepts.

SUMMARY

In general, one innovative aspect of the subject matter described in this specification can be embodied in methods that include the actions of receiving an input comprising a plurality of features of a resource, wherein each feature is a value of a respective attribute of the resource; processing each of the features using a respective embedding function to generate one or more numeric values; processing the numeric values to generate an alternative representation of the features of the resource, wherein processing the floating point values comprises applying one or more non-linear transformations to the floating point values; and processing the alternative representation of the input to generate a respective relevance score for each concept term in a predetermined set of concept terms, wherein each of the respective relevance scores measures a predicted relevance of the corresponding concept term to the resource.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Each of the embedding functions can be specific to features of a respective feature type. The method can further include obtaining the plurality of features of the resource in response to receiving an indication that an online advertisement auction is to be conducted to select one or more advertisements for inclusion in a particular presentation of the resource. The method can further include: selecting one or more of the concept terms as advertising keywords to be used in selecting candidate advertisements for participation in the online advertisement auction based on the relevance scores. The method can further include: filtering out concept terms that are not in the same language as the resource. The method can further include: filtering out concept terms that have a Term Frequency Inverse Document Frequency (TF-IDF) score that exceeds a threshold value. The numeric values can be floating point values. The numeric values can be quantized integer values, and wherein an encoding of the quantized integer values represents floating point values.

In general, another innovative aspect of the subject matter described in this specification can be embodied in methods that include the actions of obtaining data identifying training resources and one or more respective associated concept terms for each of the training resources; specifying output criteria for a respective predicted output generated by the classifier for each of the training resources; and training the embedding function layer, the neural network layers, and the classifier based on respective features of each the training resources and on the specified output criteria, wherein each feature is a value of a respective attribute of the resource.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include specifying that, for each training resource, relevance scores generated for concept terms associated with the training resource should exceed relevance scores generated for a random sample of other concept terms in the plurality of concept terms that are not associated with the training resource. The method can further include obtaining data identifying a training resource viewed by a user; obtaining data identifying an advertisement in a first resource selected by the user within a threshold time window of viewing the training resource; and associating a keyword used in placing the advertisement in the first resource with the training resource viewed by the user as a concept term.

Particular embodiments of the subject matter described in this specification can be implemented so as to realize one or more of the following advantages. A deep network can be effectively used to predict concept terms that are relevant to a resource. Once trained, the deep network can be used to predict relevant concept terms for novel resources, i.e., resources that were not previously known to the deep network. For example, the deep network can be used to select advertising keywords that are relevant to a resource. Using the deep network to select advertising keywords may result in more relevant advertisements being included in the resource, e.g., by increasing the relevance to the resource of the advertisements selected for participation in an online advertising auction conducted to place one or more advertisements in the resource.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
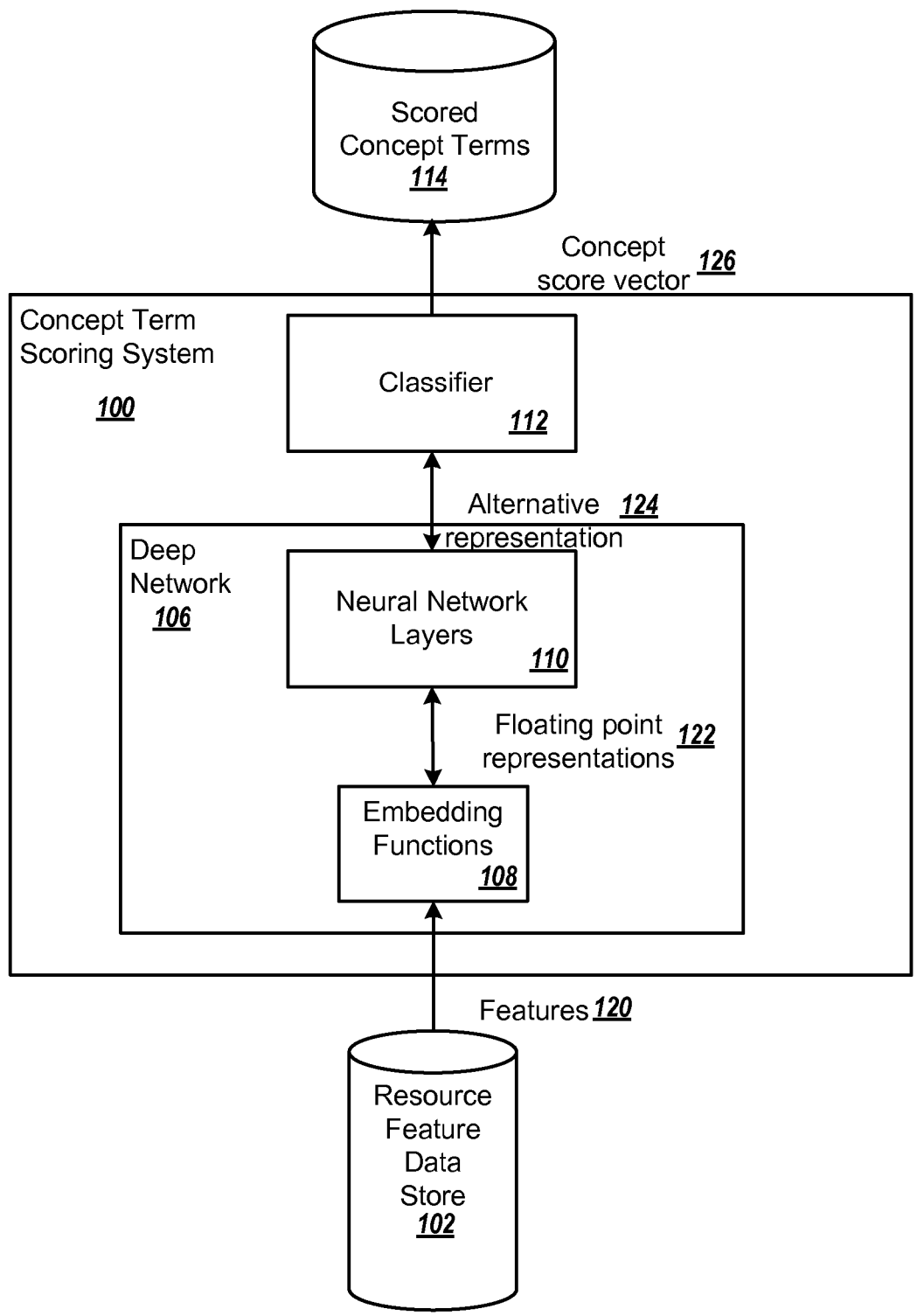
FIG. 1 is a block diagram of an example concept term scoring system.

FIG. 1 is a block diagram of an example concept term scoring system 100. The concept term scoring system 100 is an example of a system implemented as computer programs on one or more computers in one or more locations, in which the systems, components, and techniques described below can be implemented.

The concept term scoring system 100 receives an input and generates a predicted output based on the received input. In particular, the input is a set of features of a resource and the output generated by the concept term scoring system 100 based on the input is a respective score for each of a set of concept terms. The set of concept terms is predetermined and represents concepts that have been determined to be relevant to the system or to a collection of resources. The scores generated for the concept terms are predictions of how relevant each of the concept terms is to the resource. For example, the concept terms may be keywords that are used to select advertisements for participation in online advertisement auctions.

The features of the resource are values of respective attributes of the resource that characterize the resource in some way and can include features of multiple respective categorically distinct feature types. A feature of a particular type is a list of one or more active feature elements, i.e., a list of tokens or of token-value pairs, selected from a vocabulary of possible active feature elements of the feature type. For example, the tokens may be words in a natural language, e.g., English, and the vocabulary for the feature type may be the known words in the natural language. The vocabularies for the feature types may be overlapping or non-overlapping and the list for a given feature type may be ordered or unordered.

For example, the concept term scoring system 100 can receive features 120 from a feature data store 102. For example, the features 120 can be features of various feature types that have been extracted from a particular resource in response to receiving an indication that an online advertisement auction is to be conducted to select one or more advertisements to be included in a particular presentation of the resource. The features of the resource can include, e.g., any of: the uniform resource locator (URL) of the resource, the domain name of the resource, an identifier of the publisher of the resource, data obtained by the concept scoring system 100 that identifies the categories or entity types that are relevant to the resource, terms that appear most frequently in the resource, and so on. The features of the resource can also include features obtained from other systems or services that summarize the content or the utility of the resource, e.g., systems that attempt to identify the most important terms in the resource, systems that identify entities that are relevant to the resource, and so on.

The concept term scoring system 100 uses the received input features to predict an output. The output can be stored in a scored concept term data store 114 or used for some immediate purpose. In particular, the output is a vector of scores that includes a respective score for each of the set of concept terms. In the online advertising context, for example, where the input features are features of resource for which an online advertisement auction is to be conducted, the concept term scoring system 100 can generate a score for each of a set of concept terms that may be used as advertising keywords for selecting advertisements for participation in the auction.

The concept term scoring system 100 includes a deep network 106 and a classifier 112. The deep network 106 is a machine learning system that includes a set of embedding functions 108 and one or more hidden neural network layers 110, each having a respective set of parameters. Each of the embedding functions 108 receives a respective feature of a respective type and, in accordance with a set of parameters, applies a transformation to the feature that maps the feature into a numeric representation. For example, the embedding functions 108 can apply a transformation to the features 120 to map the features into floating point representations 122. Embedding functions will be described in more detail below with reference to FIG. 2.

An initial layer of the neural network layers 110 receives as an input the floating point representations of the input features generated by the embedding functions and the neural network layers 110 each apply one or more respective non-linear transformations to the floating point representations to generate an alternative representation of the input. For example, the neural network layers 110 can generate alternative representation 124 from floating point representations 122 of the features 120 received from the embedding functions 108. Instead of or in addition to the neural network layers 110, the deep network 106 may include another group of layers that applies successive linear or non-linear transformations over some or all of the floating point representations generated by the embedding functions 108.

The classifier 112 receives the alternative representation generated by the deep network 106 and predicts a value for each field of a concept score vector in accordance with values of parameters of the classifier 112. Each of the fields in the concept score vector corresponds to a respective concept term in the set of concept terms. For example, the classifier 112 can generate a concept score vector 126 from the alternative representation 124. The classifier 112 can be any multiclass or multilabel classifier, e.g., a multiclass logistic regression classifier, a multiclass support vector machine classifier, a Bayesian classifier, and so on. In some implementations, instead of the classifier 112, the concept term scoring system 100 can include a ranking function that orders the concept terms based on the alternative representation 124. The ranking function may be, e.g., a hinge-loss ranking function, a pairwise ranking function, and so on.

Figure 2:
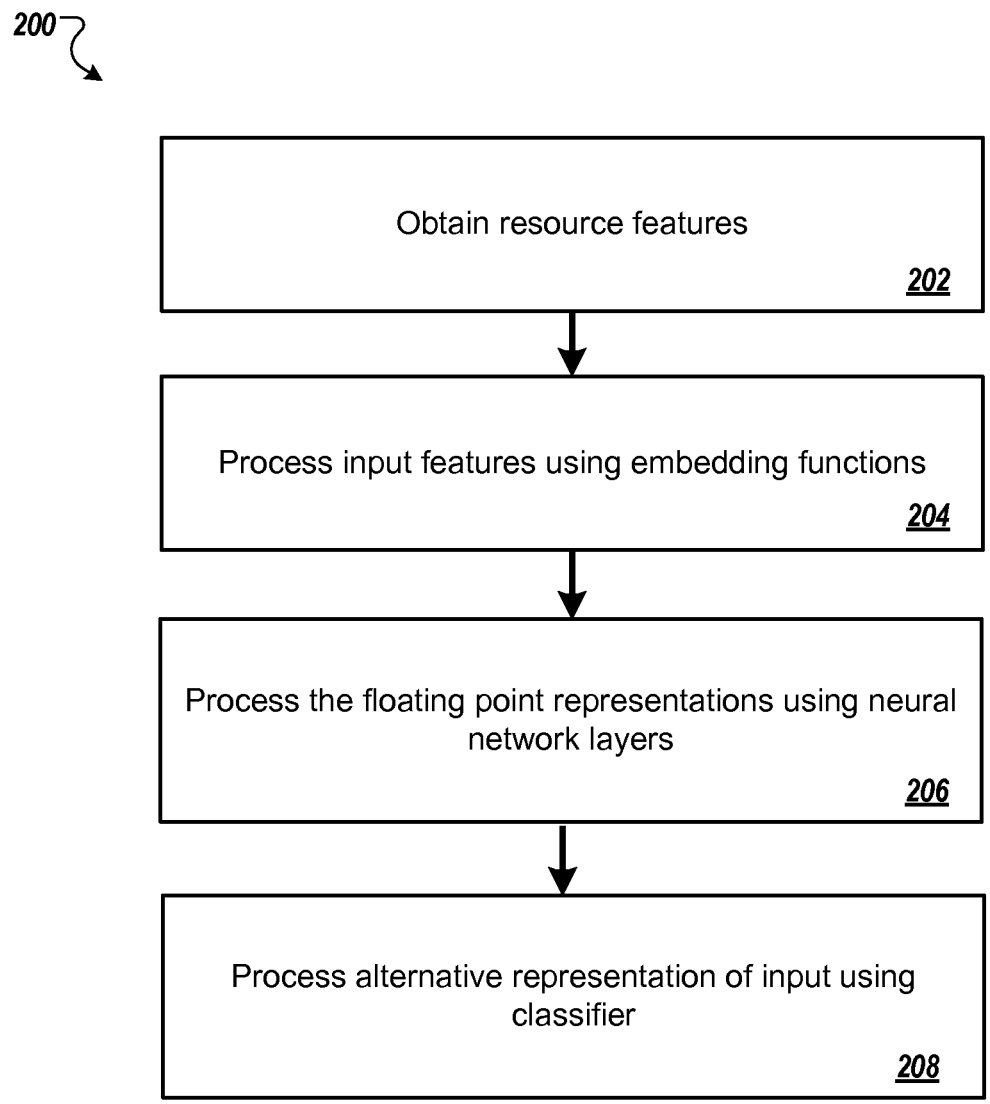
FIG. 2 is a flow diagram of an example process for scoring concept terms.

FIG. 2 is a flow diagram of an example process 200 for scoring concept terms. For convenience, the process 200 will be described as being performed by a system of one or more computers located in one or more locations. For example, a concept term scoring system, e.g., the concept term scoring system 100 of FIG. 1, appropriately programmed, can perform the process 200.

The system obtains features of a resource (step 202). As described above, the features are either an ordered or unordered list of tokens or of token-value pairs. Each feature is of a respective feature type, i.e., the list of tokens or token-value pairs that makes up the feature is selected from a vocabulary of possible active feature elements of the feature type.

The system processes each feature using the embedded function for the feature type of the feature (step 204) to generate a floating-point vector representation of the feature. Depending on the feature type and on the implementation, the embedding function for a given feature type can be any of a variety of embedding functions. The system determines the type of the feature by parsing the raw input data received by the system for each resource. For example, if a portion of the raw input data for a given resource is "URL: www.examplesite.com," the system can parse the input data to determine that one of the resource features is www.examplesite.com and that the feature is of a URL feature type.

For example, for a feature type whose features consist of a single token, the embedding function may be a simple embedding function. A simple embedding function maps a single token to a floating point vector, i.e., a vector of floating point values. For example the simple embedding function may map the token "cat" to a vector [0.1, 0.5, 0.2] and the token "tablet" to a vector [0.3, 0.9, 0.0], based on current parameter values of the embedding function, e.g., as stored in a lookup table.

As another example, for a feature type whose features can potentially consist of a list of two or more tokens, the embedding function may be a parallel embedding function. A parallel embedding function maps each token in a list of tokens to a respective floating point vector and outputs a single vector that is a concatenation of the respective floating point vectors. For example, for an ordered list of tokens "Atlanta," "Hotel"}, the parallel embedding function may map "Atlanta" to a vector [0.1, 0.2, 0.3] and "Hotel" to [0.4, 0.5, 0.6], and then output [0.1, 0.2, 0.3, 0.4, 0.5, 0.6]. In order to obtain the respective floating point vectors, the parallel embedding function may use a single lookup table or multiple different lookup tables.

As another example, for a feature type whose features can potentially consist of a list of two or more tokens, the embedding function may be a combining embedding function. A combining embedding function maps each token in the list to a respective floating point vector and then merges the respective floating point vectors into a single merged vector. The combining embedding function can merge the respective floating point vector using a linear function, e.g., a sum, average, or weighted linear combination of the respective floating point vectors, or using a nonlinear function, e.g., a component-wise maximum or a norm-constrained linear combination, for example. In order to identify the respective floating point vectors, the parallel embedding function may use a single lookup table or multiple different lookup tables. For example, for the ordered list {"Atlanta", "Hotel"}, the parallel embedding function may map "Atlanta" to a vector [0.1, 0.2, 0.3] and "Hotel" to [0.4, 0.5, 0.6], and then output the sum of the two vectors, i.e., [0.5, 0.7, 0.9].

As another example, for a feature type whose features can potentially consist of a list of two or more tokens, the embedding function may be a mixed embedding function. A mixed embedding function maps each token in a list of tokens to a respective floating point vector and generates an initial vector that is the concatenation of the respective floating point vectors. The mixed embedding function then merges the respective floating point vectors into a merged vector and concatenates the merged vector with the initial vector. For example, for the ordered list {"Atlanta", "Hotel"}, the mixed embedding function may output a concatenation of the vectors output by the parallel embedding function and the combining embedded function, i.e., [0.1, 0.2, 0.3, 0.4, 0.5, 0.6, 0.5, 0.7, 0.9].

Depending on the implementation, the system may utilize two different kinds of embedding functions for two different feature types, and the two embedding functions may or may not share parameters. For example, the system may utilize a combining embedding function for a first feature type and a mixed embedding function for a second feature type.

If one or more of the features of the resource are not discrete, prior to processing the feature using an embedding function, the system uses a hashing function to hash each non-discrete feature. The system can then partition each hashed feature into one of a pre-determined set of partitions, and process a value corresponding to the partition using the embedding function for the feature. Additionally, if a particular feature cannot be obtained for a given resource, that system can map that feature to a pre-determined value.

In some implementations, instead of floating point values, a given embedding function may generate a different kind of numeric values. For example, the embedding function may generate quantized integer values whose encoding represents floating point values.

The system processes the floating-point vector representations using one or more neural network layers (step 206). The one or more neural network layers include one or more layers of non-linear transformations, with each transformation being defined based on values of a respective set of parameters. In general, the one or more neural network layers generate an alternative representation of the input based on the floating-point vector representations of the features of the input. Optionally, the system can then process the alternative representation using a sparse binary output layer, e.g., a layer that outputs a vector that is 0 or 1 at every position. An example technique for processing the floating-point representations using neural network layers is described in Ruslan Salakhutdinov & Geoffrey Hinton, Semantic hashing, International Journal of Approximate Reasoning, 50 (2009) 969-978. However, many different techniques and mechanisms for processing the representations using neural network layers can be used.

The system processes the alternative representation of the input using a classifier (step 208) to predict an output for each of a set of concept terms. The classifier predicts the output based on values of a set of parameters and the alternative representation. The output for a given concept term is a prediction of the value of a variable that corresponds to the concept term, e.g., a score for the concept term that represents the predicted relevance of the concept described by the term to the resource. In some implementations, the system can process the alternative representation of the input using a ranking function instead of a classifier to predict a ranking of the concept terms according to their predicted relevance to the concept.

Once the scores for the concept terms are generated, the system can store the scores in a data store or use the scores for another immediate purpose. In some implementations, i.e., in the online advertising context, the system can select a specified number of one or more highest-scoring concept terms or each concept term having a score that satisfies a threshold value as advertising keywords to be used in selecting candidate advertisements for participation in an online advertising auction. In some implementations, the selected keywords are used in combination with keywords produced using other techniques to select the candidate advertisements.

Optionally, prior to making use of the selected concept terms, the system can filter out any concept terms that fail to meet one or more selection criteria. For example, the system may filter out concept terms that are in a language that does not match the language of the resource, e.g., by comparing data that identifies the language of the resource to data identifying the language of the concept term and filtering out the concept term when the data does not indicate a match. As another example, the system may filter out concept terms that have a Term Frequency Inverse Document Frequency (TF-IDF) score that exceeds a threshold value. That is, the system may filter out concept terms that have a high likelihood of being selected because they are popular terms rather than because they are particularly relevant to the resource.

The process 200 can be performed to predict scores for concept terms for an input for which the desired scores are not known.

The process 200 can also be performed on inputs in a set of training data, i.e., a set of inputs for which the output that should be predicted by the system is known, in order to train the system, i.e., to determine optimal values for the parameters of the classifier and the deep network. For example, the process 200 can be performed repeatedly on inputs selected from a set of training data as part of a backpropagation training technique that determines optimal values for each of the parameters. Training a concept term scoring system will be described in more detail below with reference to FIG. 3.

Figure 3:
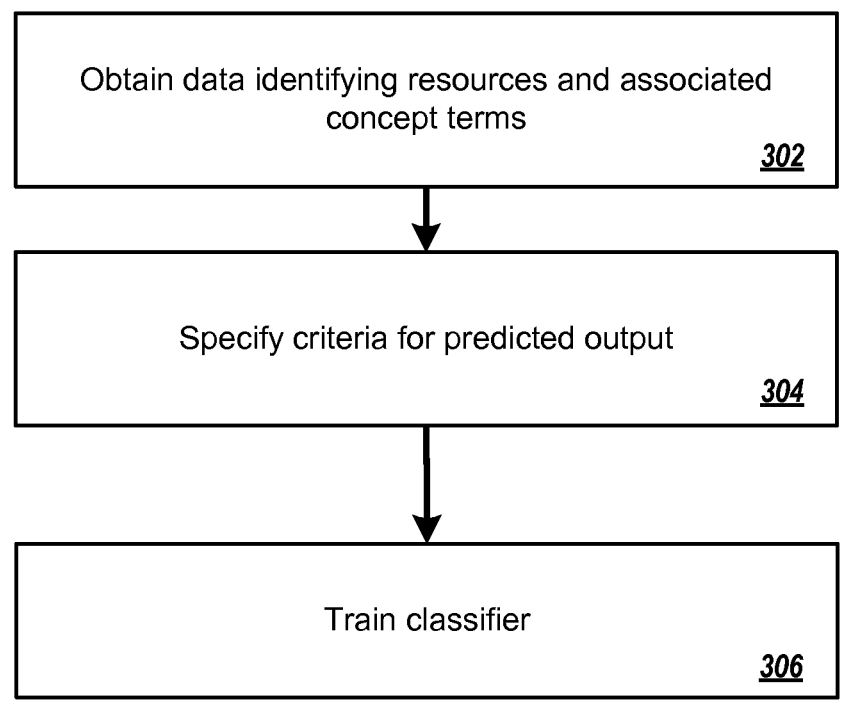
FIG. 3 is a flow diagram of an example process for training a concept term scoring system.

FIG. 3 is a flow diagram of an example process 300 for training a concept term scoring system. For convenience, the process 300 will be described as being performed by a system of one or more computers located in one or more locations. For example, a concept term scoring system, e.g., the concept term scoring system 100 of FIG. 1, appropriately programmed, can perform the process 300.

The system obtains data identifying training resources and associated concept terms for each of the training resources (step 302). For example, a concept term may be associated with a resource based on data that identifies advertisements that received a user selection within a pre-determined time window of viewing the resource. For each identified advertisement, the advertising keyword used to place the advertisement in the auction that resulted in the advertisement being presented to the user can be associated with the resource as a concept term.

The system specifies criteria for the predicted output for each of the training resources based on parameters (step 304). That is, for each resource, the system specifies criteria for the concept term scores generated by the system based on the parameters. For example, the parameters may specify that, for any training resource, the scores for the concept terms associated with the resource should be higher than any score for any other concept term in the set of concept terms or a randomly selected sample of the other concept terms in the set of concept terms. Optionally, the parameters may require that the scores for the concept terms associated with the resource exceed the other scores by a threshold value. As another example, the parameters may specify that, for any training resource, the scores for the concept terms associated with the resource should each be higher than a specified threshold value. As another example, the parameters may specify that the concept terms associated with the resource should all be in a specified number of highest-scoring concept terms. The parameters used to generate the criteria can be provided to the system, e.g., by a system administrator, and may be static, i.e., predetermined at the beginning of the training, or dynamic, i.e., can be automatically adjusted throughout the training of the system. For example, the parameters may be relaxed during training until the performance of the system degrades, and then made more stringent.

The system performs a training process to train the classifier (step 306) using the specified criteria and features of the training resources for the parameters and a set of training data. Additionally, the training process uses the method of backpropagation to adjust the parameters of all the components of a deep network, e.g., the deep network 106 of FIG. 1.

As part of the training process, if the label predicted by the classifier for a particular training resource is different from the known desired label for that particular training resource, i.e., the concept scores generated by the classifier do not satisfy the criteria for the training resource, the classifier will adjust its parameters so as to reduce the expected error on that particular input using conventional gradient based methods. Furthermore, as part of the backpropagation method, the classifier sends an error signal to the deep network, which allows the deep network to adjust the parameters of its internal components and of the set of embedding functions though successive stages of backpropagation.

In some circumstances, e.g., for large sets of training data, the training process can be parallelized in any of a variety of ways. For example, the training process can be parallelized using one or more of the techniques for parallelizing the training of a machine learning model described in "Large Scale Distributed Deep Networks," Jeffrey Dean, et al., *Neural Information Processing Systems Conference,* 2012.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
  receiving an input comprising a plurality of features of a resource, wherein each of the features is of a different feature type;
  generating an alternative representation of the features of the resource, comprising:
    generating a respective numeric representation of each the features by processing each of the features using a respective embedding function, wherein each of the embedding functions is specific to features of a respective feature type, and processing the respective numeric representations through one or more neural network layers to generate the alternative representation; and providing the alternative representation of the features of the resource as input to a neural network classifier for classification of a relevance of a plurality of concept terms to the resource.

2. The method of claim 1, wherein the neural network classifier is configured to:

process the alternative representation of the features of the resource to generate a respective relevance score for each of the plurality of concept terms, wherein each of the respective relevance scores measures a predicted relevance of the corresponding concept term to the resource.

3. The method of claim 1, wherein the numeric representations are vectors of floating point values.

4. The method of claim 1, wherein the numeric representations are vectors of quantized integer values, and wherein an encoding of the quantized integer values represents floating point values.

5. The method of claim 1, further comprising:

obtaining the plurality of features of the resource in response to receiving an indication that an online advertisement auction is to be conducted to select one or more advertisements for inclusion in a particular presentation of the resource.

6. The method of claim 5, further comprising:

selecting one or more of the concept terms as advertising keywords to be used in selecting candidate advertisements for participation in the online advertisement auction based on the classification of the relevance of the concept terms to the resource.

7. The method of claim 1, wherein a particular feature of the plurality of features is not discrete, and wherein the method further comprises:

hashing the particular feature to generate a hashed feature;
partitioning the hashed feature into a particular partition of a predetermined set of partitions; and
processing a value corresponding to the particular partition using the embedding function for the feature.

8. A system comprising one or more computers and one or more storage devices storing instructions that when executed by the one or more computers cause the one or more computers to perform operations comprising:

receiving an input comprising a plurality of features of a resource, wherein each of the features is of a different feature type;
generating an alternative representation of the features of the resource, comprising:
  generating a respective numeric representation of each the features by processing each of the features using a respective embedding function, wherein each of the embedding functions is specific to features of a respective feature type, and
  processing the respective numeric representations through one or more neural network layers to generate the alternative representation; and
providing the alternative representation of the features of the resource as input to a neural network classifier for classification of a relevance of a plurality of concept terms to the resource.

9. The system of claim 8, wherein the neural network classifier is configured to:

process the alternative representation of the features of the resource to generate a respective relevance score for each of the plurality of concept terms, wherein each of the respective relevance scores measures a predicted relevance of the corresponding concept term to the resource.

10. The system of claim 8, wherein the numeric representations are vectors of floating point values.

11. The system of claim 8, wherein the numeric representations are vectors of quantized integer values, and wherein an encoding of the quantized integer values represents floating point values.

12. The system of claim 8, the operations further comprising:

obtaining the plurality of features of the resource in response to receiving an indication that an online advertisement auction is to be conducted to select one or more advertisements for inclusion in a particular presentation of the resource.

13. The system of claim 12, the operations further comprising:

selecting one or more of the concept terms as advertising keywords to be used in selecting candidate advertisements for participation in the online advertisement auction based on the classification of the relevance of the concept terms to the resource.

14. The system of claim 8, wherein a particular feature of the plurality of features is not discrete, and wherein the method further comprises:

hashing the particular feature to generate a hashed feature;
partitioning the hashed feature into a particular partition of a predetermined set of partitions; and
processing a value corresponding to the particular partition using the embedding function for the feature.

15. One or more non-transitory computer storage media storing instructions that when executed by one or more computers cause the one or more computers to perform operations comprising:

receiving an input comprising a plurality of features of a resource, wherein each of the features is of a different feature type;
generating an alternative representation of the features of the resource, comprising:
  generating a respective numeric representation of each the features by processing each of the features using a respective embedding function, wherein each of the embedding functions is specific to features of a respective feature type, and
  processing the respective numeric representations through one or more neural network layers to generate the alternative representation; and
providing the alternative representation of the features of the resource as input to a neural network classifier for classification of a relevance of a plurality of concept terms to the resource.

16. The computer storage media of claim 15, wherein the neural network classifier is configured to:

process the alternative representation of the features of the resource to generate a respective relevance score for each of the plurality of concept terms, wherein each of the respective relevance scores measures a predicted relevance of the corresponding concept term to the resource.

17. The computer storage media of claim 15, wherein the numeric representations are vectors of floating point values.

18. The computer storage media of claim 15, wherein the numeric representations are vectors of quantized integer values, and wherein an encoding of the quantized integer values represents floating point values.

19. The computer storage media of claim 15, the operations further comprising:

obtaining the plurality of features of the resource in response to receiving an indication that an online advertisement auction is to be conducted to select one or more advertisements for inclusion in a particular presentation of the resource.

20. The computer storage media of claim 19, the operations further comprising:

selecting one or more of the concept terms as advertising keywords to be used in selecting candidate advertisements for participation in the online advertisement auction based on the classification of the relevance of the concept terms to the resource.

* * * * *